(12) United States Patent
Sata et al.

(10) Patent No.: US 12,424,682 B2
(45) Date of Patent: Sep. 23, 2025

(54) METAL-AIR CELL

(71) Applicant: SHARP KABUSHIKI KAISHA, Sakai (JP)

(72) Inventors: Shunsuke Sata, Sakai (JP); Hirotaka Mizuhata, Sakai (JP); Tomo Kitagawa, Sakai (JP); Toyoka Aimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 556 days.

(21) Appl. No.: 17/612,146

(22) PCT Filed: May 12, 2020

(86) PCT No.: PCT/JP2020/018930
§ 371 (c)(1),
(2) Date: Nov. 17, 2021

(87) PCT Pub. No.: WO2020/235389
PCT Pub. Date: Nov. 26, 2020

(65) Prior Publication Data
US 2022/0247016 A1 Aug. 4, 2022

(30) Foreign Application Priority Data
May 21, 2019 (JP) .................... 2019-095421

(51) Int. Cl.
*H01M 12/06* (2006.01)
*H01M 12/08* (2006.01)
(Continued)

(52) U.S. Cl.
CPC ........... *H01M 12/06* (2013.01); *H01M 12/08* (2013.01); *H01M 50/105* (2021.01);
(Continued)

(58) Field of Classification Search
CPC .... H01M 12/06; H01M 12/08; H01M 50/105; H01M 50/198; H01M 50/55;
(Continued)

(56) References Cited

U.S. PATENT DOCUMENTS

2003/0129489 A1* 7/2003 Kamisuki ............... H01M 4/66
429/185
2009/0142660 A1* 6/2009 Hori .................. H01M 10/6567
429/174
(Continued)

FOREIGN PATENT DOCUMENTS

JP          S5530148 A          3/1980
JP       2007157412 A   *  6/2007   ............. Y02E 60/10
(Continued)

OTHER PUBLICATIONS

JP 2007157412 A mach. trans. (Year: 2007).*
WO 2025095537 mach. trans. (Year: 2025).*

*Primary Examiner* — Jonathan G Leong
*Assistant Examiner* — John S Medley
(74) *Attorney, Agent, or Firm* — ScienBiziP, P.C.

(57) ABSTRACT

Provided is a metal-air cell whose electrolytic solution is kept from leaking from an outer pouch housing an electrode. Hence, the metal-air cell excels in reliability and safety. The metal-air cell includes a negative electrode and a positive electrode each including a lead. The lead includes a sealing member provided to an outer face of the lead. The outer pouch includes a fusing portion in which the sealing member and the lead are held and fused together. The fusing portion seals the outer pouch. The sealing member includes an adhesive layer covering the lead inside the outer pouch.

12 Claims, 12 Drawing Sheets

(51) Int. Cl.
*H01M 50/105* (2021.01)
*H01M 50/188* (2021.01)
*H01M 50/191* (2021.01)
*H01M 50/193* (2021.01)
*H01M 50/197* (2021.01)
*H01M 50/198* (2021.01)
*H01M 50/55* (2021.01)
*H01M 50/553* (2021.01)
*H01M 50/562* (2021.01)
*H01M 50/534* (2021.01)

(52) U.S. Cl.
CPC ....... *H01M 50/188* (2021.01); *H01M 50/191* (2021.01); *H01M 50/193* (2021.01); *H01M 50/197* (2021.01); *H01M 50/198* (2021.01); *H01M 50/55* (2021.01); *H01M 50/553* (2021.01); *H01M 50/562* (2021.01); *H01M 50/534* (2021.01)

(58) Field of Classification Search
CPC ............. H01M 50/193; H01M 50/553; H01M 50/188; H01M 50/197; H01M 50/562; H01M 50/534
USPC .......................................................... 429/403
See application file for complete search history.

(56) References Cited

U.S. PATENT DOCUMENTS

2017/0033422 A1* 2/2017 Kim .................... H01M 4/8657
2017/0125786 A1* 5/2017 Park ..................... H01M 50/581

FOREIGN PATENT DOCUMENTS

| JP | 2018-049687 A | 3/2018 | |
|---|---|---|---|
| WO | 2016052293 A1 | 4/2016 | |
| WO | WO-2018186463 A1 * | 10/2018 | ............. B23B 27/32 |
| WO | WO-2025095537 A1 * | 5/2025 | .......... H01M 50/534 |

* cited by examiner

A-A

B-B

C-C

D-D

E-E

F-F

G-G

H-H

K-K

METAL-AIR CELL

TECHNICAL FIELD

The present disclosure relates to a metal-air cell. The present application claims priority from Japanese Patent Application JP2019-095421, filed on May 21, 2019, the content of which is hereby incorporated by reference in its entirety.

BACKGROUND ART

Metal-air cells, including a positive electrode, a negative electrode, and an electrolytic solution, and having high energy density, are being developed and studied for practical use. A typical outer pouch used for a metal-air cell is a metal container and a resin container. Moreover, laminated metal-air cells are also proposed. A laminated metal-air cell includes an outer pouch made of a laminate packing material containing thermally adhesive resin. The outer pouch houses electrodes and an electrolytic solution.

A metal-air cell disclosed, for example, in Patent Document 1 includes: an electrode including a negative electrode, a separator, a positive electrode, and a water-repellent film stacked on top of another, an alkaline electrolytic solution; and an outer pouch made of a laminate packing material and housing the electrode and the alkaline electrolytic solution. The electrode has tab leads each previously provided with a polypropylene tape to enhance sealability of welding portions between the tab leads and the laminate packing material.

CITATION LIST

Patent Literature

Patent Document 1: Japanese Unexamined Patent Application Publication No. 2018-049687

Summary

Technical Problems

As illustrated in FIG. 18, the above known metal-air cell, a metal-air cell 101, includes a laminate packing material 102 and an electrode 103. The electrode 103 has a tab lead 104 extending outside from the laminate packing material 102. The laminate packing material 102 is sealed while the tab lead 104 extends outside. Polypropylene 105 attached to the tab lead 104 is bonded to the laminate packing material 102 by heat sealing.

However, an alkaline electrolytic solution housed in the laminate packing material 102 has a problem. The alkaline electrolytic solution might decrease bonding between the tab lead 104 and the polypropylene 105, and easily leak between the laminate packing material 102 and the tab lead 104.

The present disclosure is conceived in view of the above known problems, and intended to provide a metal-air cell whose electrolytic solution is kept from leaking from an outer pouch housing an electrode. Hence, the metal-air cell excels in reliability and safety.

Solution to Problems

In order to achieve the above the above intension, a metal-air cell according to the present disclosure includes a negative electrode; a positive electrode; and an outer pouch housing the negative electrode and the positive electrode. At least one of the negative electrode and the positive electrode include a lead extending outside from an inside of the outer pouch. The lead includes a sealing member provided to an outer face of the lead. The outer pouch includes a fusing portion in which the sealing member and the lead are held and fused together. The fusing portion seals the outer pouch. The sealing member includes an adhesive layer covering the lead inside the outer pouch.

Thanks to such features, the sealing portion forms a good adhesion interface with respect to the lead, making it possible to keep an electrolytic solution from leaking.

In the metal-air cell described above, the sealing member further includes preferably a resin film layer fused with the outer pouch. Thanks to such a feature, the outer pouch and the sealing member fuses together more tightly, making it possible to further keep the electrolytic solution from leaking.

In the metal-air cell described above, the adhesive layer preferably adheres to the lead. Thanks to such a feature, the adhesive layer forms a good adhesion interface with respect to the lead, making it possible to keep an electrolytic solution from leaking.

In the metal-air cell described above, the resin film layer may be in contact with the lead, and the adhesive layer may coat an interface between the resin film layer and the lead. Thanks to such features, the resin film layer of the sealing member fuses well with the outer pouch. Moreover, the adhesive layer coats the adhesion interface between the resin film layer and the lead, making it possible to keep the electrolytic solution from leaking.

In the metal-air cell described above, in the fusing portion between the outer pouch and the lead, the sealing member may include the resin film layer and the adhesive layer stacked together to respectively face the outer pouch and the lead. Thanks to such features, the resin film layer of the sealing member fuses well with the outer pouch. Moreover, the adhesive layer forms a good adhesion interface between the resin film layer and the lead to keep the electrolytic solution from leaking.

In the metal-air cell described above, the outer pouch is preferably formed of a resin film material, and the resin film layer is preferably formed of a resin film material containing macromolecules equal in composition to macromolecules of the resin film material forming the outer pouch. Thanks to such features, a good interface is formed in fusing the resin film layer included in the sealing member and the outer pouch, such that the outer pouch and the sealing member are sealed to be liquid-tight.

In the metal-air cell described above, the sealing member preferably includes the adhesive layer, and the adhesive layer is preferably provided between the outer pouch and the lead. Thanks to such features, die adhesion layer included in the sealing member forms a good adhesion interface between the outer pouch and the lead, making it possible to keep the electrolytic solution from leaking.

Advantageous Effects of Invention

A metal-air cell according to the present disclosure can keep an electrolytic solution from leaking from an outer pouch and improve the cell performance.

DESCRIPTION OF EMBODIMENTS

Described below with reference to drawings is a metal-air cell 1 according to embodiments of the present disclosure.

Figure 1:
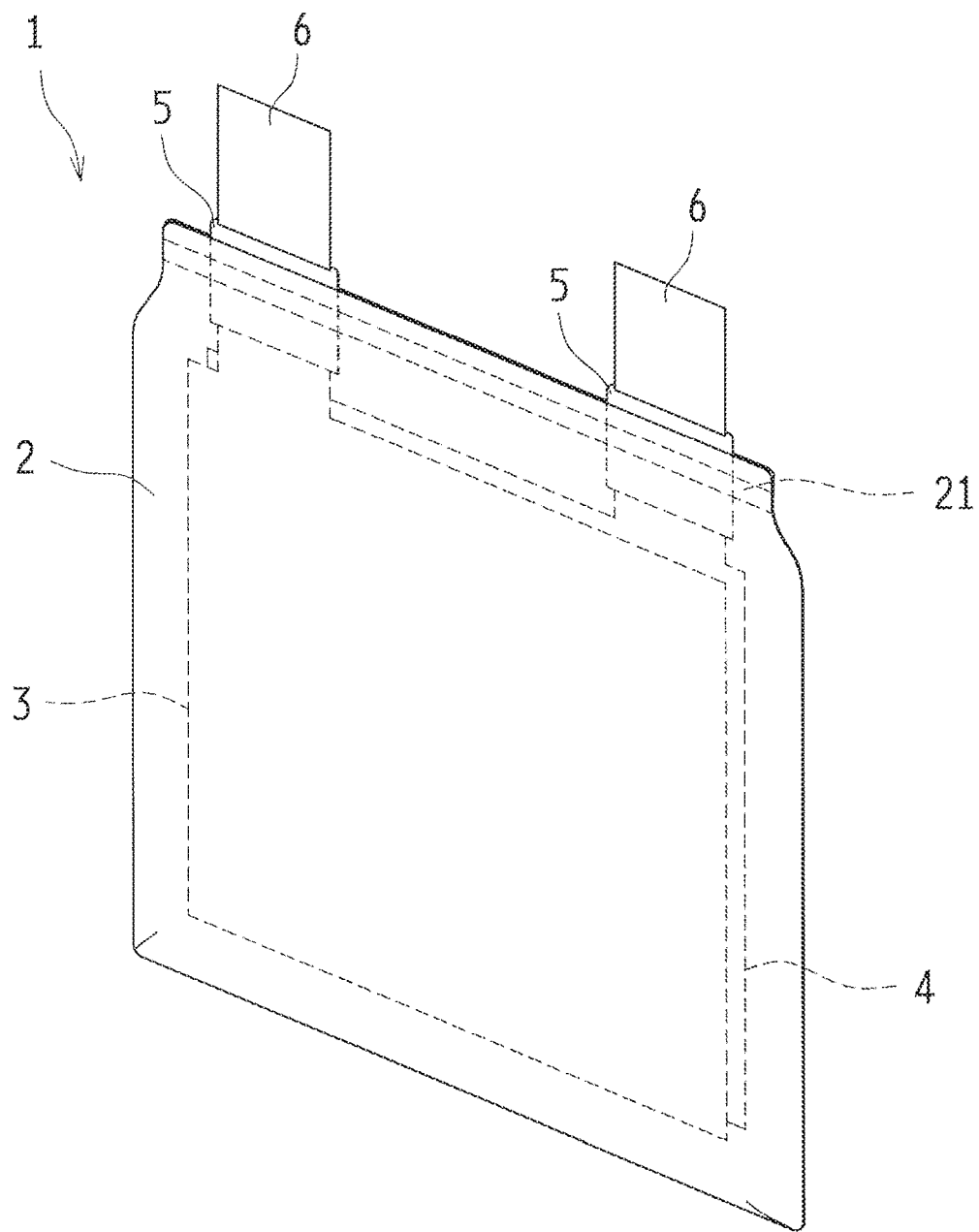
FIG. 1 is a schematic perspective view of a metal-air cell according to the present disclosure.

FIG. 1 is a schematic perspective view of the metal-air cell 1 according to the present disclosure. The metal-air cell 1 according to the present disclosure includes: an outer pouch 2; a negative electrode 3; and a positive electrode 4. The outer pouch 2, a sheet-like exterior case, houses the negative electrode 3 and the positive electrode 4.

Each of the negative electrode 3 and the positive electrode 4 includes a lead 6 extending outside from the inside of the outer pouch 2. The outer pouch 2 is fused and sealed while the lead 6 extends outside the outer pouch 2.

The outer pouch 2, a bag-like container with the bottom closed, is prepared to have the top opened to house the negative electrode 3 and the positive electrode 4. The outer pouch 2 houses therein the negative electrode 3, the positive electrode 4, and an electrolytic solution. The top of the outer pouch 2 is fused and sealed.

The outer pouch 2 is preferably made of a resin material exhibiting corrosion resistance to the electrolytic solution, heat resistance, and thermal adhesiveness. The electrolytic solution, an ion-conductive liquid, is preferably, for example, an alkali metal hydroxide aqueous solution (an alkaline electrolytic solution).

In the embodiments, the outer pouch 2 is preferably formed of a thermoplastic resin material highly resistant to alkalis. For example, the thermoplastic resin material is preferably a polyolefin-based resin film material (a laminate film) such as polypropylene and polyethylene. Moreover, the outer pouch 2 is formed of, but not limited to, a single-layer structure including a single layer of the resin film material. Alternatively, the outer pouch 2 may be formed of a multilayer structure including multiple layers.

The lead 6 is provided to each of the negative electrode 3 and the positive electrode 4. The lead 6 may have any given shape as long as the lead 6 can be used in this technical field. For example, the lead 6 is shaped into a wire, a mesh, a foil sheet, and a plate. In particular, the lead 6 is preferably formed of metal foil in view of preventing the electrolytic solution from leaking around the lead 6 and increasing a cross-sectional area of the conductor to obtain higher power. For the negative electrode 3, the lead 6 is preferably formed of, for example, nickel foil, nickel-plated iron foil, tin-plated nickel foil, copper foil, and brass foil. Moreover, for the positive electrode 4, the lead 6 is preferably formed of nickel foil.

As can be seen, the top of the outer pouch 2 is fused and sealed to form a fusing portion 21. In the fusing portion 21, the lead 6 is fused to the outer pouch 2 through a sealing member 5. The lead 6 has at least a region previously provided with the sealing member 5. The outer pouch 2 is fused, holding the sealing member 5 and the lead 6.

The sealing member 5 included in the metal-air cell 1 according to the present disclosure can be formed in various manners. Details of the sealing member 5 will be described in the embodiments below.

First Embodiment

Figure 2:
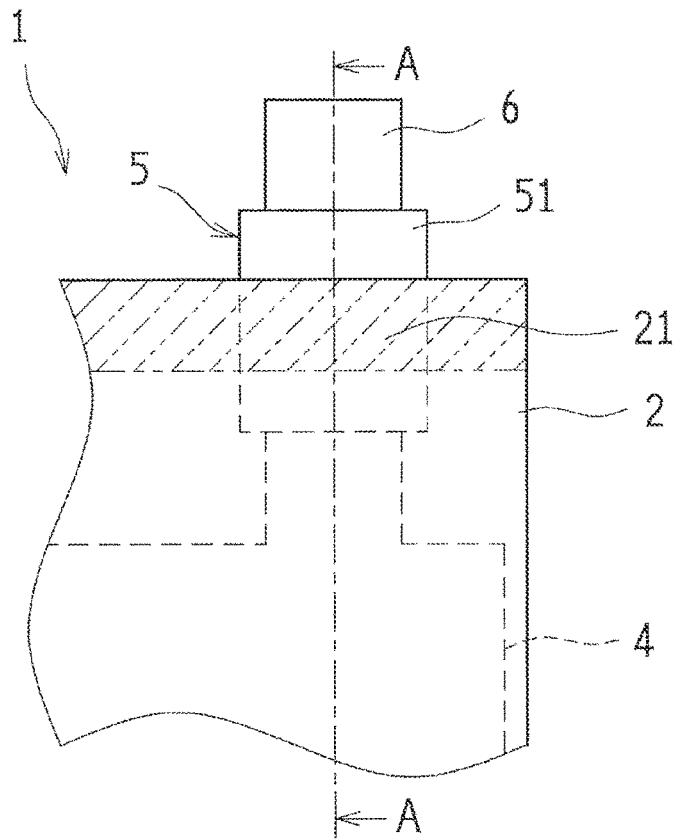
FIG. 2 is a front elevation view of an upper portion of the metal-air cell according to a first embodiment of the present disclosure.
Figure 3:
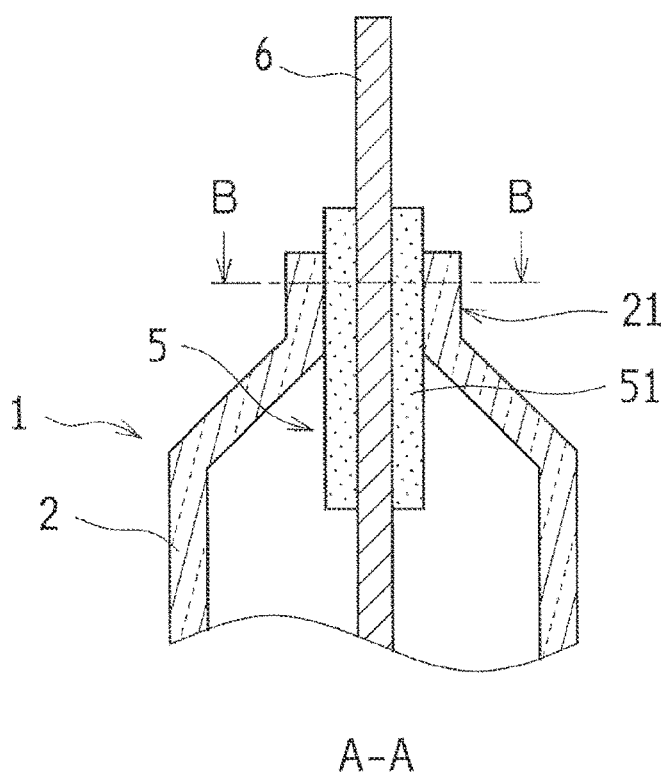
FIG. 3 is a cross-sectional view taken along line A-A in FIG. 2.
Figure 4:
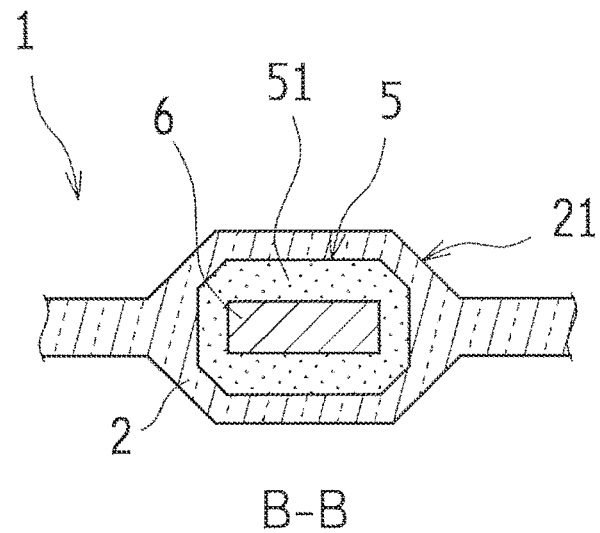
FIG. 4 is a cross-sectional view taken along line B-B in FIG. 3.

FIGS. 2 to 4 illustrate the metal-air cell 1 according to the first embodiment of the present disclosure. FIG. 2 is a front elevation view of an upper portion of the metal-air cell 1. FIG. 3 is a cross-sectional view taken along line A-A in FIG. 2. FIG. 4 is a cross-sectional view taken along line B-B in FIG. 3. Note that, for the sake of description, the top of FIGS. 1 and 2 is hereinafter assumed as the top of the metal-air cell 1.

As illustrated in FIG. 1, in the metal-air cell 1, the lead 6 is provided to each of the negative electrode 3 and the positive electrode 4. Each lead 6 includes the sealing member 5. The sealing member 5 is previously provided to an outer face of the lead 6.

In the production process, the outer pouch 2 is provided therein with the negative electrode 3 and the positive electrode 4, and fused by heat sealing while the lead 6 extends out of the outer pouch 2. The electrolytic solution is injected into the outer pouch 2. After that, the top of the outer pouch 2 is fused.

As illustrated in FIG. 2, the lead 6 is a metal strip extending above the positive electrode 4. The lead 6 has an outer surface coated with the sealing member 5. Likewise, the lead 3 also has the lead 6 provided with the sealing member 5. The sealing member 5 does not have to be provided to the entire lead 6. As illustrated in FIG. 2, the sealing member 5 is disposed to a portion of the lead 6 in the longitudinal direction. The portion corresponds at least to a region in which the lead 6 is fused to the outer poach 2.

For example, the outer pouch 2 is fused to seal a certain area of the top including an upper end of the outer pouch 2. The outer pouch 2 is fused by heat sealing and ultrasonic sealing. Hence, the fusing portion 21 is formed at the top of the outer pouch 2. In FIG. 2, the fusing portion 21 is hatched for identification. On the lead 6, the sealing member 5 is disposed to overlap the fusing portion 21. Out of the outer pouch 2, the sealing member 5 is provided to extend above the fusing portion 21. In the outer pouch 2, the sealing member 5 is provided to extend below the fusing portion 21.

Note that the sealing member 5 may be positioned in the fusing portion 21 between the outer pouch 2 and the lead 6. As illustrated in FIGS. 2 and 3, the sealing member 5 may be provided to be exposed outside from the upper end of the outer pouch 2. Alternatively, the sealing member 5 may be coated with the outer pouch 2 not to be exposed outside the outer pouch 2.

The sealing member 5 includes an adhesive layer 51 provided to coat the outer surface of the lead 6. In this embodiment, the sealing member 5 is formed of a single adhesive layer 51.

As illustrated in FIG. 3, the top of the outer pouch 2 includes the fusing portion 21 in which the lead 6 is held and integrally fused with the top by heat sealing. In this fusing portion 21, the outer pouch 2 and the lead 6 are bonded together, and sealed, through the adhesive layer 51 serving as the sealing member 5.

Moreover, as illustrated in FIG. 4, the adhesive layer 51 is provided between the outer pouch 2 and the lead 6. The adhesive layer 51 comes into intimate contact with, and leaves no space on, the outer surface of the lead 6. The adhesion interface between the outer pouch 2 and the lead 6 is coated with the adhesive layer 51, such that no space is left therebetween. Hence, the adhesion interface is formed well.

The adhesive layer 51 is adhesive to the lead 6 and highly transformable. That is, the adhesive layer 51 is formed of a material capable of forming a good adhesion interface with respect to the lead 6.

An exemplary material of the adhesive layer 51 contains a compound represented by a general expression (I):

[Formula 1]

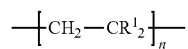
(I)

Wherein, $R^1$ is an alkyl group with 1 to 3 carbons, and n is an integer of 1 or larger.

In the general expression (I), the two $R^1$ may be alkyl groups with the same number of carbons.

Another exemplary material of the adhesive layer 51 contains a compound represented by a general expression (II):

[Formula 2]

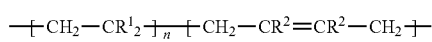
(II)

Wherein, $R^1$ is an alkyl group with 1 to 3 carbons, $R^2$ is a hydrogen atom, a halogen atom, or an alkyl group with 1 to 3 carbons, and n is an integer of 1 or larger.

In the general expression (II), the two $R^2$ may be alkyl groups with the same number of carbons. If one of $R^2$ is a hydrogen atom or a halogen atom, the other $R^2$ is the alkyl group with 1 to 3 carbons.

Still another preferable exemplary material of the adhesive layer 51 contains a compound represented by a general expression (II):

[Formula 3]

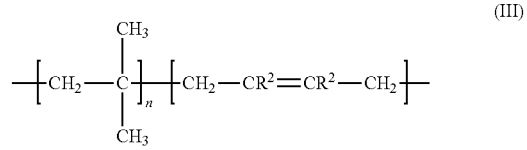
(III)

Wherein, $R^2$ is a hydrogen atom, a halogen atom, or an alkyl group with 1 to 3 carbons, and n is an integer of 1 or larger.

A preferable example of the adhesive layer 51 includes a macromolecule compound containing —$CH_2$—$C(CH_3)_2$— (hereinafter referred to as a building block U) and a double bond. More preferably, the adhesive layer 51 is formed of a material containing butyl rubber in which a small amount of isoprene is copolymerized to isobutylene. Here, the butyl rubber is an alkyl group having two $R^1$ in the expression (I) both with 1 carbon.

Here, the building block U is derived from isobutylene that is a material of the butyl rubber. The building block U has multiple methyl groups as backbone chains, such that motion of the molecules decreases and permeation of the macromolecule chains to the molecules is reduced. Such a feature makes the adhesive layer 51 less permeable to the electrolytic solution, which is effective in keeping the electrolytic solution from leaking.

Furthermore, as a preferable example of the adhesive layer 51, the adhesive layer 51 is desirably formed of a material containing unvulcanized butyl rubber. In the unvulcanized butyl rubber, the macromolecule chains are not cross-linked by vulcanization, thereby exhibiting excellent plasticity and adherence. The plasticity makes it possible to form an interface with no space left to an object to be adhered, and the adherence makes it possible to form an interface in excellent intimate contact with the object to be adhered. Such features can keep the electrolytic solution from permeating through the adhesion interface.

The amount of the compound contained in the adhesive layer 51 and represented by the general expression (I) or (III) is preferably 80 wt % or more. Such a feature makes it possible to provide the adhesive layer 51 with excellent adherence and liquid sealability.

As illustrated in FIG. 4, in the metal-air cell 1, the outer pouch 2 and the sealing member are fused and sealed to be liquid-tight in the fusing portion 21. Moreover, because the adhesive layer 51 provided as the sealing member 5 exhibits plasticity, an excellent adhesion interface is formed between the lead 6 and the adhesive layer 51 with no space left therebetween. Furthermore, the adhesive layer 51, which is highly adhesive, comes into contact well with, and adheres to, the lead 6. Hence, the electrolytic solution is kept from flowing between the adhesive layer 51 and the lead 6.

Hence, in the metal-air cell 1, the above features keep the electrolytic solution from leaking from the fusing portion 21 through which the lead 6 extends, so that the outer pouch 2 is stably sealed. As a result, the metal-air cell 1 improves its performance, safety, and long-time reliability, making it possible to have a longer lifetime.

Second Embodiment

Figure 5:
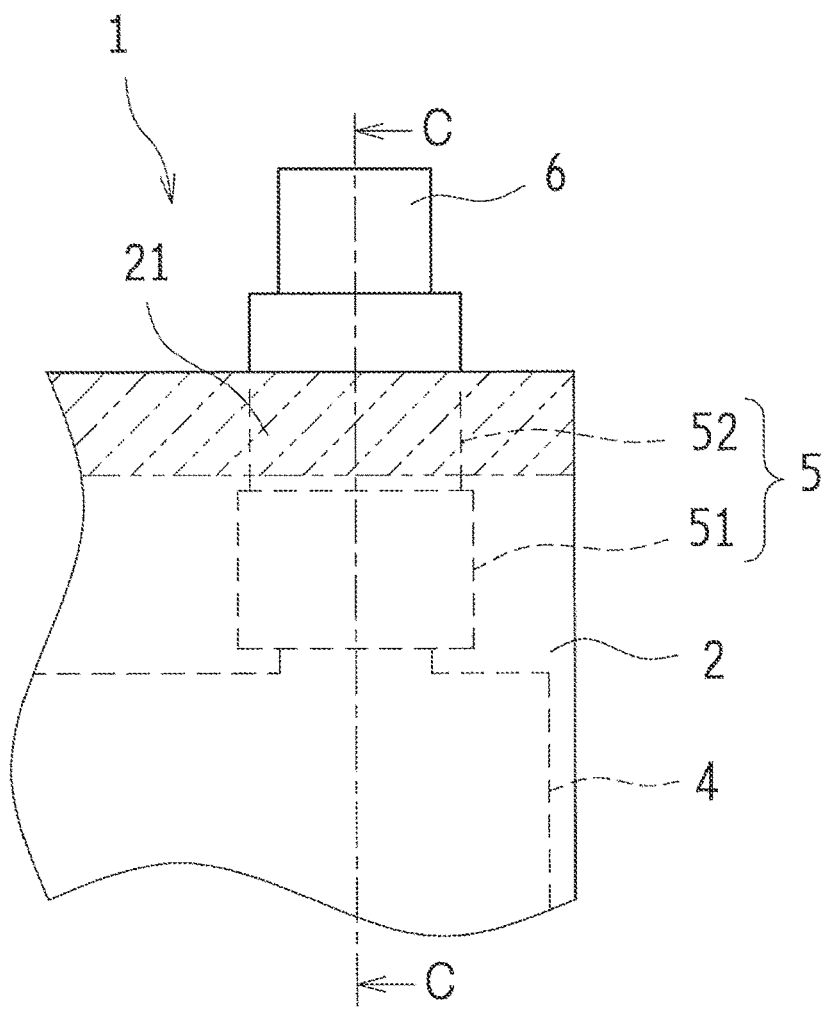
FIG. 5 is a front elevation view of an upper portion of the metal-air cell according to a second embodiment of the present disclosure.
Figure 6:
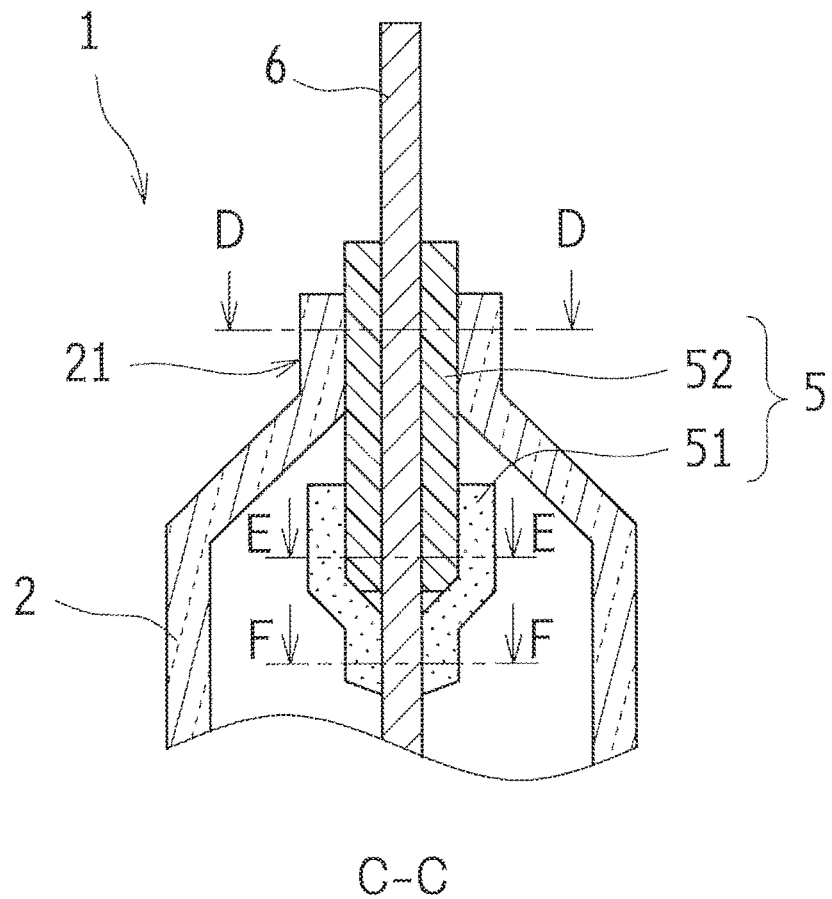
FIG. 6 is a cross-sectional view taken along line C-C in FIG. 5.
Figure 7:
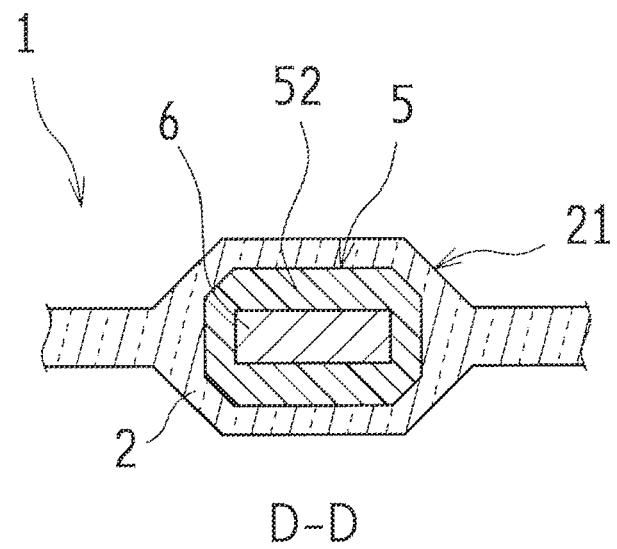
FIG. 7 is a cross-sectional view taken along line D-D in FIG. 6.
Figure 8:
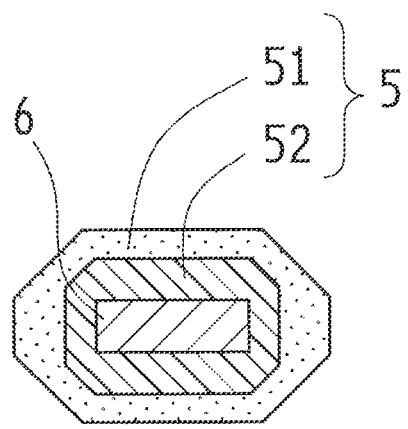
FIG. 8 is a cross-sectional view taken along line E-E in FIG. 6.
Figure 9:
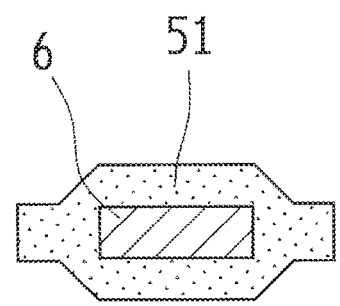
FIG. 9 is a cross-sectional view taken along line F-F in FIG. 6.

FIGS. 5 to 9 illustrate the metal-air cell 1 according to a second embodiment of the present disclosure. FIG. 5 is a front elevation view of an upper portion of the metal-air cell 1. FIG. 6 is a cross-sectional view taken along line C-C in FIG. 5. FIG. 7 is a cross-sectional view taken along line D-D in FIG. 6. FIG. 8 is a cross-sectional view taken along line E-E in FIG. 6. FIG. 9 is a cross-sectional view taken along line F-F in FIG. 6.

Note that the embodiments to be described below have basic features in common with the first embodiment, and include characteristic features of the sealing member 5. Hence, the sealing member 5 is described in detail. Other features are denoted with identical reference signs between the embodiments and the first embodiment, and will not be elaborated upon.

In the first embodiment, the sealing member 5 is formed of the adhesive layer 51. In this embodiment, the sealing member 5 includes the adhesive layer 51 and a resin film layer 52. The adhesive layer 51 is made of the materials described in the first embodiment 1.

As illustrated in FIGS. 5 and 6, the sealing member 5 includes the adhesive layer 51, and additionally includes the resin film layer 52 that fuses with the outer pouch 2. The adhesive layer 51 is provided in intimate contact with the lead 6, and the resin film layer 52 is provided out of the adhesive layer 51 and fused with the outer pouch 2.

The sealing member 5 includes a multilayer portion of the adhesive layer 51 and the resin film layer 52. The resin film layer 52, an interior layer, is provided to a longitudinally intermediate portion of the lead 6, and fuses at least with the outer pouch 2. The resin film layer 52 has an area overlapping the fusing portion 21. As illustrated in the examples of FIGS. 5 and 6, the resin film layer 52 is provided to extend out of the outer pouch 2. In the outer pouch 2, the resin film layer 52 extends also below the fusing portion 21.

In contrast, the adhesive layer 51 is provided to coat an interface between the resin film layer 52 and the lead 6. As illustrated in FIGS. 5 and 6, the adhesive layer 51 is provided below the fusing portion 21, and externally provided to the interface between the resin film layer 52 and the lead 6.

As the sealing member 5, the adhesive layer 51 and the resin film 52 partially stack together, and coat vertically different areas of the lead 6. Here, the adhesive layer 51 is externally provided across the resin film layer 52 and the lead 6. An upper portion of the adhesive layer 51 coats the resin film layer 52, and a lower portion of the adhesive layer 51 coats the lead 6.

As illustrated in FIG. 7, in the metal-air cell 1, the fusing portion 21, a fused portion of the outer pouch 2, is formed of the outer pouch 2 fusing with the resin film layer 52. In the fusing portion 21, the resin film layer 52 is adhered to the lead 6 with no space left. Moreover, as illustrated in FIG. 8, the resin film layer 52 and the adhesive layer 51 in the outer pouch 2 are stacked together below the fusing portion 21 and externally adhered to the lead 6. Below the stack, as illustrated in FIG. 9, the adhesive layer 51 alone is externally adhered to the lead 6.

Hence, the adhesive layer 51 provided as the sealing member 5 exhibits plasticity. That is why the adhesive layer 51 is adhered to the lead 6 and the resin film layer 52 with no space left between the adhesive layer 51 and the lead 6 and between the adhesive layer 51 and the resin film layer 52. Moreover, the adhesive layer 51 exhibits high adherence, coming into good intimate contact with the lead 6 and the resin film layer 52.

Thanks to such features, a good adhesion interface is formed between the adhesive layer 51 and the lead 6 and between the adhesive layer 51 and the resin film layer 52, making it possible to keep the electrolytic solution from reaching the interface between the lead 6 and the resin film layer 52. Furthermore, the electrolytic solution does not come into contact with the interface between the lead 6 and the resin film layer 52 both coated with the adhesive layer 51. The electrolytic solution does not permeate through the interface between the lead 6 and the resin film layer 52, both of which are relatively low in fusing strength. Such a feature can reduce the risk that the permeating electrolytic solution causes interface delamination between the lead 6 and the resin film layer 52, and leaks out of the fusing portion 21.

The resin film layer 52 is preferably formed of a resin film material containing macromolecules equal in composition to macromolecules of the resin film material forming the outer pouch 2. Such a resin film material is preferably formed of a material containing a polyolefin-based resin represented by a general expression (IV):

[Formula 4]

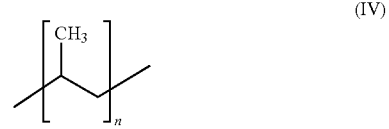

(IV)

Alternatively, the resin film material is preferably formed of a material containing a polyolefin-based resin represented by a general expression (V):

[Formula 5]

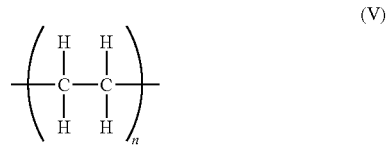

(V)

An example of the resin film material containing the macromolecule compound represented by the general expression (IV) includes a polypropylene film. An example of the resin film material containing the macromolecule compound represented by the general expression (V) includes a polyethylene film.

Unlike the case of the first embodiment in which the adhesive layer 51 and the outer pouch 2 formed of different materials are directly fused together, the resin film layer 52 is formed of the above resin film materials, such that, in the fusing, the macromolecules contained in the outer pouch 2 and the resin film layer 52 are fused together. Hence, in the metal-air cell 1, the outer pouch 2 and the resin film layer 52 can be held highly integrally in the fusing portion 21, so that the fusing portion 21 can be greatly resistant to the permeating electrolytic solution and the electrolytic solution can be kept from leaking outside.

In the fusing portion 21, the resin film layer 52 is integrally fused with the outer pouch 2, and adhered to both the outer pouch 2 and the lead 6. As illustrated in FIG. 5, the sealing member 5 is wider (i.e. a transverse width in the drawing) than the lead 6. Moreover, the resin film layer 52 is wider than the lead 6. The adhesive layer 51 is as wide as, or wider than, the resin film layer 52.

As can be seen, the sealing member 5 is formed in such a size that the outer surface (including the front, rear, and side faces) of the lead 6 is coated with the resin film layer 52 with no space left. Moreover, the outer surface of the resin film layer 52 is coated with the adhesive layer 51, so that the interface between the resin film layer 52 and the lead 6 can be kept from being exposed.

Hence, in the metal-air cell 1, the above features reduce the risk that the electrolytic solution leaks from the fusing portion 21 through which the lead 6 extends, so that the outer pouch 2 can be stably sealed. As a result, the metal-air cell 1 improves its performance and long-time reliability, making it possible to have a longer lifetime.

Third Embodiment

Figure 10:
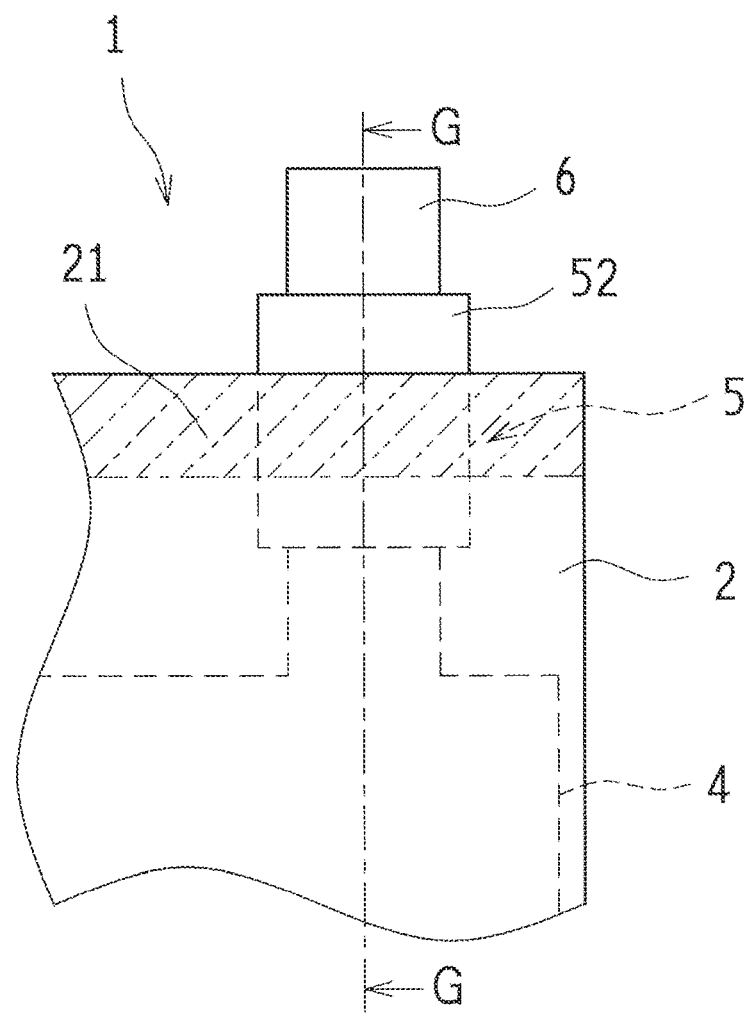
FIG. 10 is a front elevation view of an upper portion of the metal-air cell according to a third embodiment of the present disclosure.
Figure 11:
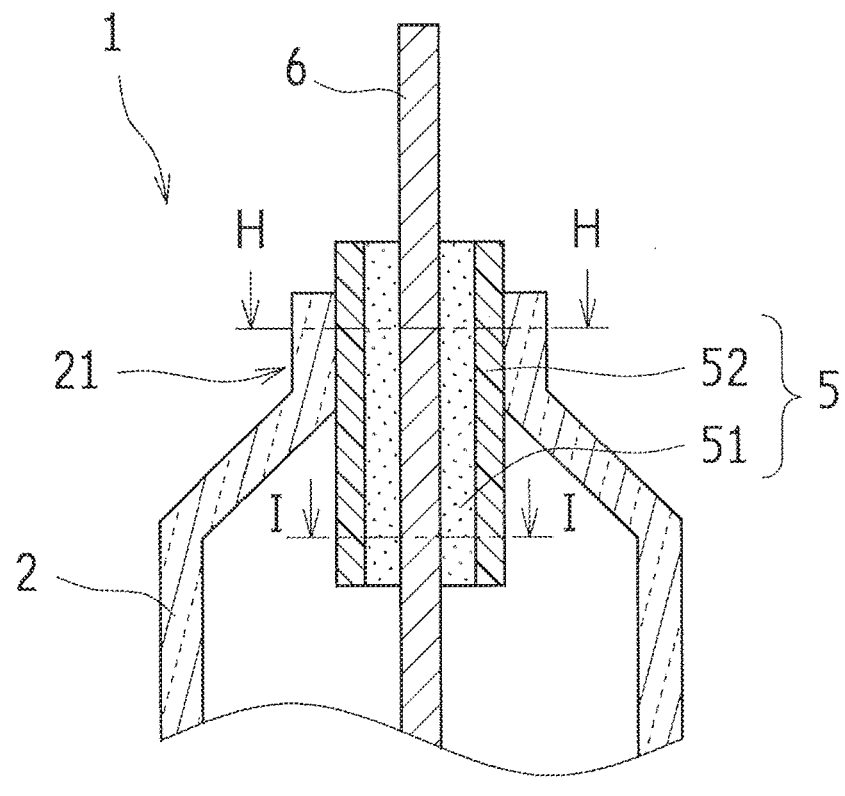
FIG. 11 is a cross-sectional view taken along line G-G in FIG. 10.
Figure 12:
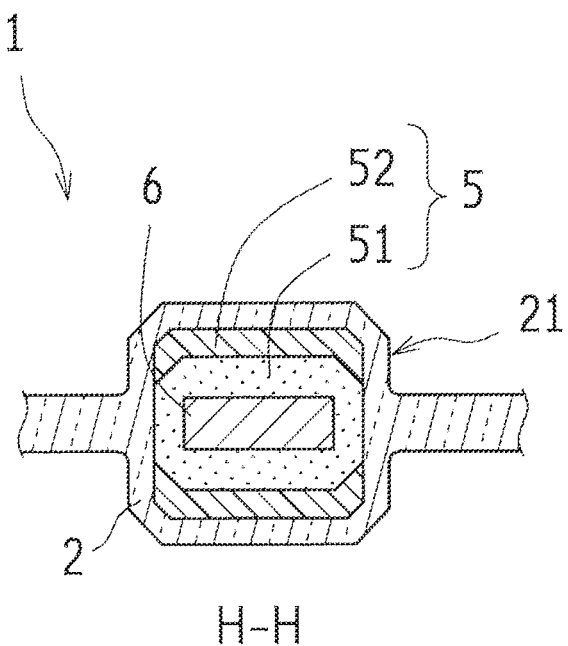
FIG. 12 is a cross-sectional view taken along line H-H in FIG. 11.
Figure 13:
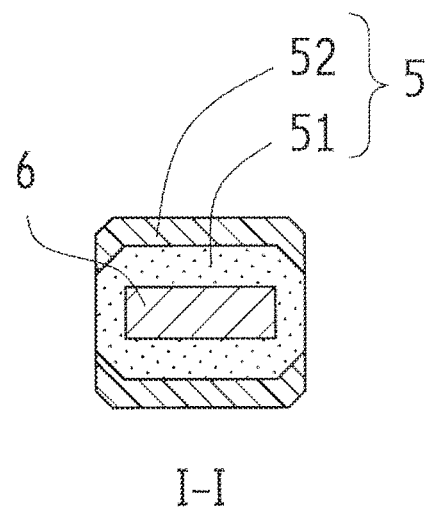
FIG. 13 is a cross-sectional view taken along line I-I in FIG. 11.

FIGS. 10 to 13 illustrate the metal-air cell 1 according to a third embodiment of the present disclosure. FIG. 10 is a front elevation view of an upper portion of the metal-air cell 1. FIG. 11 is a cross-sectional view taken along line G-G in FIG. 10. FIG. 12 is a cross-sectional view taken along line H-H in FIG. 11. FIG. 13 is a cross-sectional view taken along line I-I in FIG. 11.

The metal-air cell 1 according to the third embodiment includes the adhesive layer 51 and the resin film layer 52 stacked together as the sealing member 5. As illustrated in FIG. 11, in the fusing portion 21 between the lead 6 and the outer pouch 2, the sealing member 5 includes the adhesive layer 51 and the resin film layer 52 sequentially stacked together to respectively face the lead 6 and the outer pouch 2.

As illustrated in FIG. 12, the adhesive layer 5I is provided to adhere to the lead 6. The resin film layer 52 externally provided to the adhesive layer 51 is fused with the outer pouch 2. Moreover, in the cross-sectional view taken from line I-I in FIG. 11 and illustrating the inside of the outer pouch 2 shown in FIG. 13, the sealing member 5 includes the resin film layer 52 and the adhesive layer 51 stacked together as shown in FIG. 12.

Hence, the outer pouch 2 and the resin film layer 52 can held highly integrally in the fusing portion 21, so that the fusing portion 21 can be greatly resistant to the permeating electrolytic solution and the electrolytic solution can be kept from leaking outside. Moreover, the adhesive layer 51, exhibiting excellent adherence to both the lead 6 and the resin film layer 52, is provided between the lead 6 and the resin film layer 52 to keep the electrolytic solution from leaking along the lead 6. Furthermore, the interfaces between the lead 6 and the adhesive layer 51 and between the resin film layer 52 and the adhesive layer 51 are coated tightly with no space left. Such a feature keeps the electrolytic solution from permeating through the interfaces.

In the metal-air cell 1 according to this embodiment, as illustrated in FIGS. 10 and 12, the sealing member 5 is wider (i.e. a transverse width in the drawing) than the lead 6. In addition, the adhesive layer 51 is wider than the lead 6 so that the outer surface (including the front, rear, and side faces) of the lead 6 is coated with the adhesive layer 51 with no space left. Moreover, the resin film layer 52 is as wide as, or wider than, the adhesive layer 51.

As can be seen, the sealing member 5 is formed in such a size that the outer surface (including the front, rear, and side faces) of the lead 6 and the outer pouch 2 can be sealed together highly integrally with no space left when the outer pouch 2 is sealed by heat sealing to form the fusing portion 21. Furthermore, the lead 6 is coated with the adhesive layer 51 behind the resin film layer 52, so that the lead 6 can be kept from being exposed.

In the metal-air cell 1, the above features reduce the risk that the electrolytic solution leaks from the fusing portion 21 through which the lead 6 extends, so that the outer pouch 2 can be stably sealed. As a result, the metal-air cell 1 improves its performance and long-time reliability, making it possible to have a longer lifetime.

Moreover, when the sealing member 5 including the resin film layer 52 and the adhesive layer 51 stacked together is used, the resin film layer 52 protects a face of the adhesive layer 51. In handling the sealing member 5, such a feature keeps an object from attaching to the adhesive layer 51 to improve efficiency in assembly of the metal-air cell 1.

Fourth Embodiment

Figure 14:
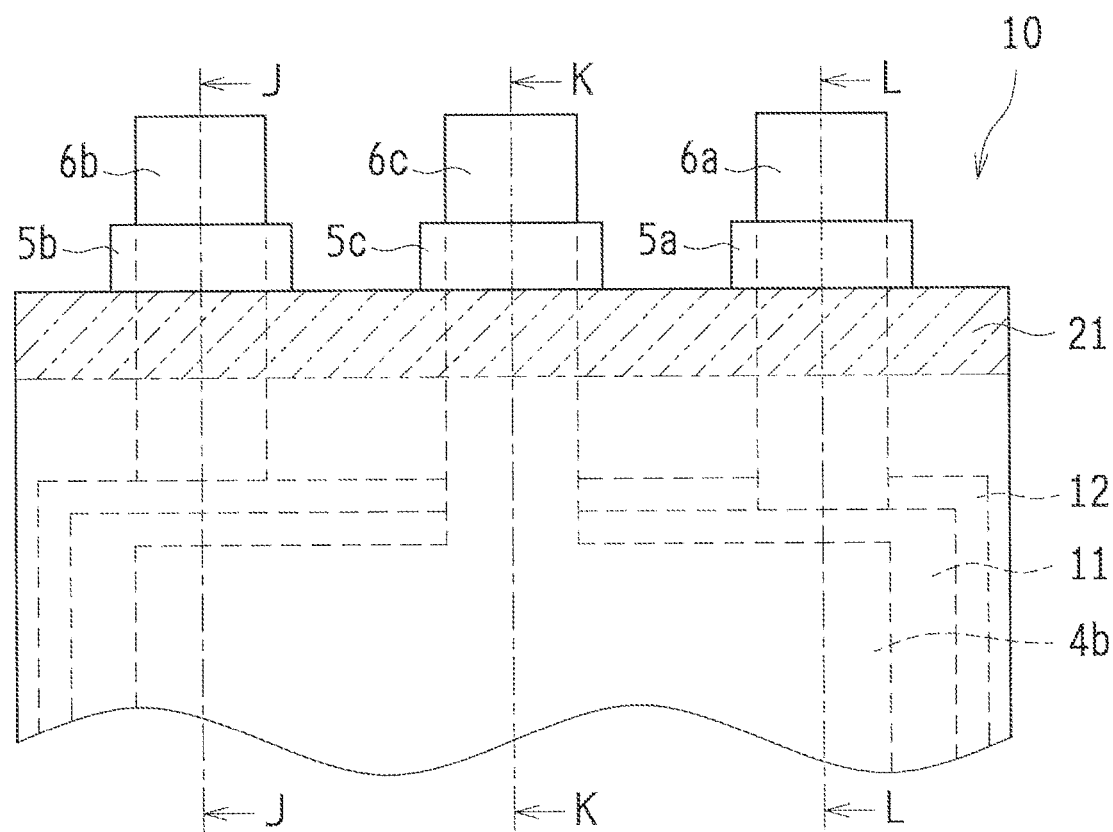
FIG. 14 is a front elevation view of an upper portion of a metal-air cell according to a fourth embodiment of the present disclosure.
Figure 15:
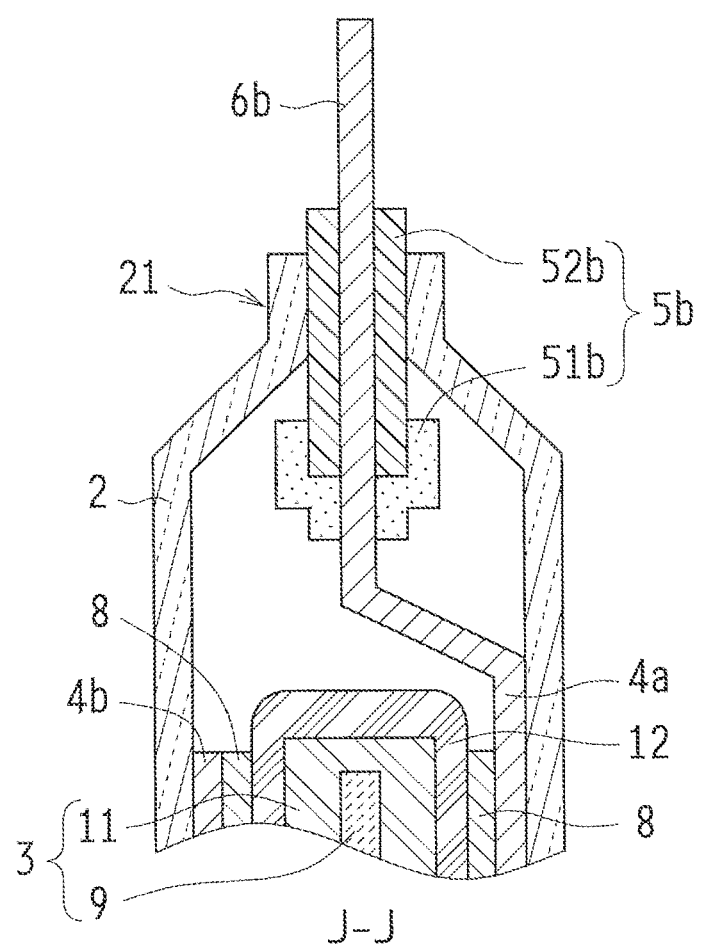
FIG. 15 is a cross-sectional view taken along line J-J in FIG. 14.
Figure 16:
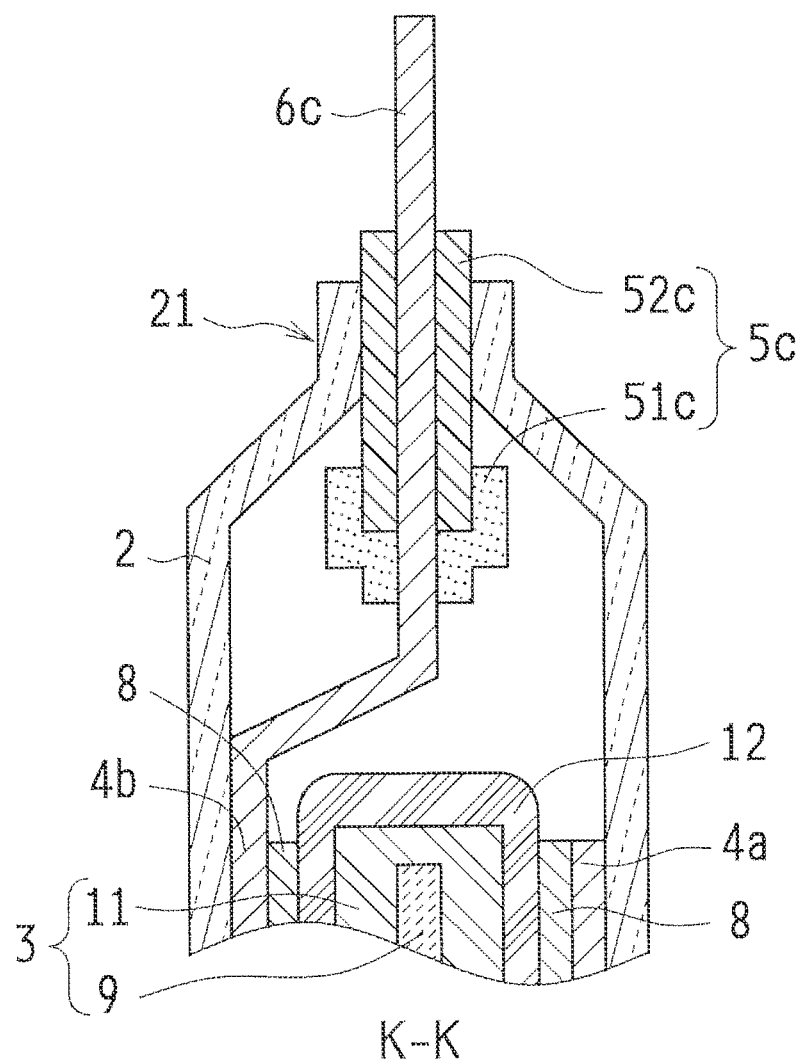
FIG. 16 is a cross-sectional view taken along line K-K in FIG. 14.
Figure 17:
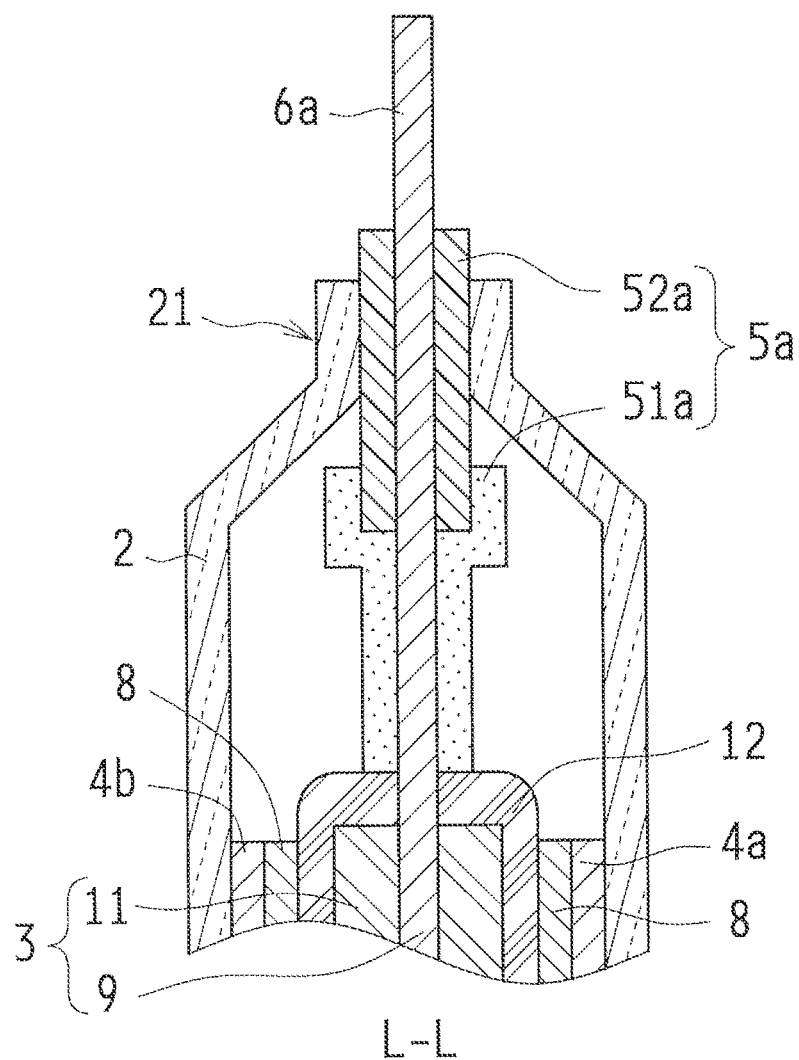
FIG. 17 is a cross-sectional view taken along line L-L in FIG. 14.
Figure 18:
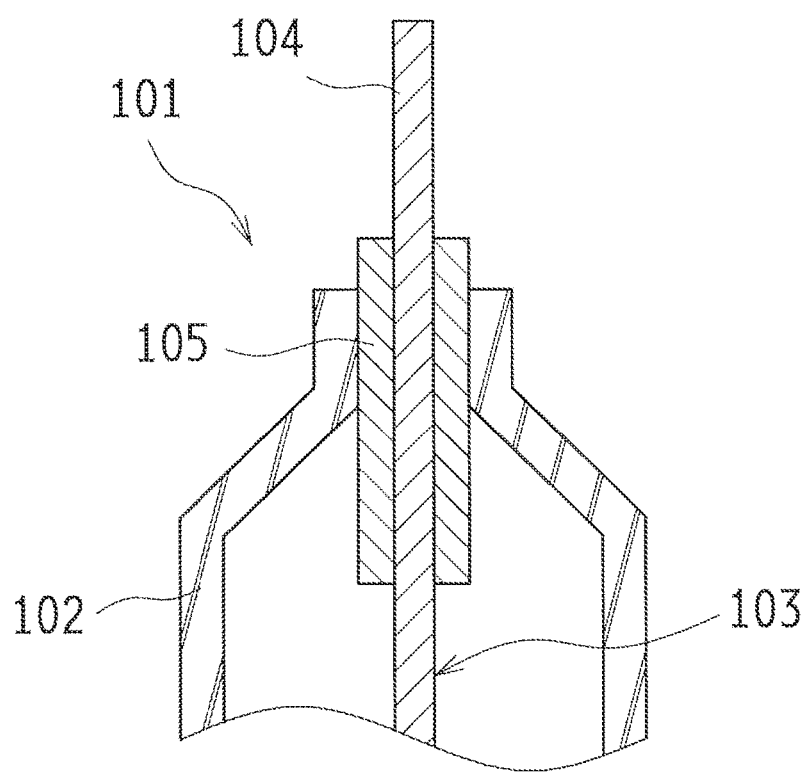
FIG. 18 is a partial cross-sectional view schematically showing a known metal-air cell.

FIG. 14 is a front elevation view of an upper portion of a metal-air cell 10 according to a fourth embodiment of the present disclosure. FIG. 15 is a cross-sectional view taken along line J-J in FIG. 14. FIG. 16 is a cross-sectional view taken along line K-K in FIG. 14. FIG. 17 is a cross-sectional view taken along line L-L in FIG. 14.

Note that the embodiments to be described below have basic features in common with the second embodiment, and include characteristic features of the negative electrode 3 and positive electrodes 4a and 4b. Hence, the negative electrode 3 and the positive electrodes 4a and 4b are described in detail. Other features are denoted with identical reference signs between the embodiments below and the first and second embodiments, and will not be elaborated upon.

As illustrated in FIG. 14, the metal-air cell 10 according to the fourth embodiment of the present disclosure includes three leads 6a, 6b, and 6c extending out of the outer pouch 2. In the fusing portion 21 at the top of the outer pouch 2, sealing members 5a, 5b, and 5c are positioned between the outer pouch 2 and leads 6a, 6b, and 6c, and sealed to be liquid-tight.

The metal-air cell 10 includes the negative electrode 3, the positive electrode 4a, and the positive electrode 4b arranged and immersed in the electrolytic solution 8 in the outer pouch 2.

The negative electrode 3 includes: a collector 9 having the lead 6a, and a negative active material layer 11 containing a negative active material to be electrically connected to the collector.

The positive electrode 4a is disposed to face the negative electrode 3. The positive electrode 4a is, for example, an air electrode including, for example, the lead 6b and an oxygen-reducing catalyst capable of reducing oxygen.

The positive electrode 4b is disposed across the negative electrode 3 from the positive electrode 4a. If the metal-air cell according to the fourth embodiment is a primary cell, the positive electrode 4b is an air electrode including, for example, the lead 6c and an oxygen-reducing catalyst capable of reducing oxygen. If the metal-air cell according to the fourth embodiment is a secondary cell, the positive electrode 4b is an electrode including, for example, the lead 6c and an oxygen-generating catalyst capable of generating oxygen.

A separator containing the electrolytic solution 8 is positioned between the negative electrode 3 and the positive electrode 4a and between the negative electrode 3 and the positive electrode 4b. As illustrated in FIGS. 14 to 17, a separator 12 is, for example, shaped into a bag to house a metal active material layer 11 of the negative electrode 3. The lead 6a extends out of the separator 12 shaped into a bag.

The leads 6a, 6b, and 6c are respectively provided with the sealing members 5a, 5b, and 5c, and extend out of the outer pouch 2. The leads 6a, 6b, and 6c have portions positioned inside the outer pouch 2. The entire portions are coated with the sealing member 5 and not exposed. The sealing members 5a, 5b, and 5c may be die same in configuration as the sealing members of any of the first to third embodiments.

Hence, in the fusing portion 21 of the outer pouch 2 in the metal-air cell 10, the sealing members 5a, 5b, and 5c are positioned between the outer pouch 2 and the leads 6a, 6b, and 6c, and sealed to be liquid-tight. In the outer pouch 2, the sealing members 5a, 5b, and 5c are externally provided to the leads 6a, 6b, and 6c, respectively, so that the interfaces between the leads 6a, 6b, and 6c and the sealing members 5a, 5b, and 5c are not in contact with the electrolytic solution 8.

Hence, in the metal-air cell 10, the above features keep the electrolytic solution from leaking from the fusing portion 21 through which the leads 6a, 6b, and 6c extend, so that the outer pouch 2 is stably sealed. Moreover, the sealing members 5a, 5b, and 5c prevent contact between the leads 6a, 6b, and 6c and the electrolytic solution 8. In recharging the metal-air cell 10, such a feature makes it possible to reduce formation of metal deposit on the leads 6a, 6b, and 6c, and prevent short circuit among the electrodes.

Other Embodiments

The metal-air cell 1 according to the present disclosure can be provided in various forms other than the forms described in the above embodiments. For example, in the metal-air cell 1, the configuration of the sealing member 5 shall not be limited to the configurations described in the above embodiments. The sealing member 5 may be of a multi-layered structure including three layers or more. Moreover, the above metal-air cell 1 is suitable as, for example, a zinc-air cell, a lithium-air cell, a sodium-air cell, a calcium-air cell, a magnesium-air cell, an aluminum-air cell, and an iron-air cell. The metal-air cell 1 is applicable as a primary cell and a secondary cell. In particular, the metal-air cell 1 is effectively applicable as a zinc-air cell using an alkaline electrolytic solution that is highly permeating.

Example 1

As an example of the metal-air cell 1 according to the second embodiment, the outer pouch 2 was formed of a two-layer resin film material including a polyethylene layer having a thickness of 150 μm and a nylon layer having a thickness of 15 μm.

The lead 6 was formed of a nickel foil sheet having a thickness of 100 μm and a width of 10 mm. A polyethylene layer was adhered to a region of the lead 6 in the longitudinal direction, in order to serve as the resin film layer 52 of the sealing member 5. This polyethylene layer, having a thickness of 100 μm and a size of 14 mm by 10 mm, was bonded to opposing sides of the nickel foil sheet by heat sealing.

Moreover, as the adhesive layer 51 of the sealing member 5, a butyl tape was attached across the nickel foil sheet and the polyethylene layer. This butyl tape was a water-proof and air-tight tape No. 6951 having a thickness of 1.3 mm and manufactured by Nitto Denko Corporation. The butyl tape was sized 20 mm by 5 mm.

The outer pouch 2 was used in a manner that the nylon layer faced outside. The polyethylene layer of the outer pouch 2 and the resin film layer 52 were heat-sealed with an impulse sealer to form the fusing portion 21. Hence, obtained was the metal-air cell 1 in which the polyethylene layer of the outer pouch 2 was fused with the polyethylene layer coating the nickel foil sheet as the lead 6, and the adhesion interface between the lead 6 and the outer pouch 2 was liquid-tight.

Example 2

As an example of the metal-air cell 1 according to the third embodiment, the outer pouch 2 was formed of a two-layer resin film material including a polyethylene layer having a thickness of 150 μm and a nylon layer having a thickness of 15 μm.

The lead 6 was formed of a nickel foil sheet having a thickness of 100 μm and a width of 10 mm. A butyl tape was attached to a region of the lead 6 in the longitudinal direction, and the adhesive layer 51 and the resin film layer 52 of the sealing member 5 were formed. This butyl tape was a tape No. 55 (a multilayer including a polyethylene layer and an adhesive layer) having a thickness of 400 μm and manufactured by Nitto Denko Corporation. The butyl tape was sized 14 mm by 10 mm. The adhesive layer of the butyl tape was attached to the nickel foil sheet while the polyethylene layer of the butyl tape was faced outside.

The outer pouch 2 was used in a manner that the nylon layer faced outside. The polyethylene layer of the outer pouch 2 and the polyethylene layer of the butyl tape were heat-sealed with an impulse sealer to form the fusing portion 21. Hence, obtained was the metal-air cell 1 in which the polyethylene layer of the outer pouch 2 was fused with the polyethylene layer of the butyl tape coating the nickel foil sheet as the lead 6, and the adhesion interface between the lead 6 and the outer pouch 2 was liquid-tight.

Note that, preferably, the lead 6 of the positive electrode 4 is formed of a nickel foil sheet, whereas, the lead 6 of the negative electrode 3 is formed of a copper foil sheet having a thickness of 100 μm and a width of 10 mm.

As can be seen, the metal-air cells 1 and 10 according to the present disclosure can effectively reduce the leak of the electrolytic solution from the outer pouch 2. Thanks to such a feature, the metal-air cells 1 and 10 can improve their performance and excel in reliability and safety.

Disclosure shall not be limited to the embodiments described above, and can be modified in various manners within the scope of claims. The technical aspects disclosed in different embodiments are to be appropriately combined together to implement another embodiment. Such an embodiment shall be included within the technical scope of disclosure.

The invention claimed is:

1. A metal-air cell, comprising:
   a negative electrode;
   a positive electrode; and
   an outer pouch housing the negative electrode and the positive electrode,
   wherein:
      at least one of the negative electrode and the positive electrode includes a lead extending outside from an inside of the outer pouch,
      the lead includes a sealing member provided to an outer face of the lead,
      the outer pouch includes a fusing portion in which the sealing member and the lead are held and fused together, the fusing portion sealing the outer pouch, the sealing member including:
an adhesive layer covering the lead inside the outer pouch, and
a resin film layer fused with the outer pouch,
the resin film layer is directly in contact with the lead, and
the adhesive layer is externally provided across the resin film layer and the lead and coats an interface between the resin film layer and the lead at an end of the resin film layer located inside the outer pouch so that the interface between the resin film layer and the lead is kept from being exposed to an electrolytic solution inside the outer pouch.

2. The metal-air cell according to claim 1, wherein the adhesive layer adheres to the lead.

3. The metal-air cell according to claim 1, wherein the outer pouch is formed of a resin film material, and the resin film layer is formed of a resin film material containing macromolecules equal, in composition, to macromolecules of the resin film material forming the outer pouch.

4. The metal-air cell according to claim 1, wherein the adhesive layer contains a compound represented by a general expression (I):

[Formula 1]

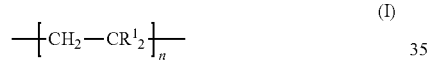
(I)

wherein $R^1$ is an alkyl group with 1 to 3 carbons, and n is an integer of 1 or larger.

5. The metal-air cell according to claim 1, wherein the adhesive layer contains a compound represented by a general expression (II):

[Formula 2]

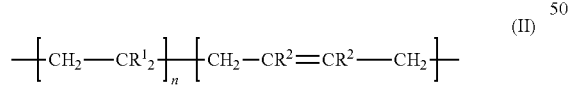
(II)

wherein $R^1$ is an alkyl group with 1 to 3 carbons, $R^2$ is a hydrogen atom, a halogen atom, or an alkyl group with 1 to 3 carbons, and n is an integer of 1 or larger.

6. The metal-air cell according to claim 1, wherein the adhesive layer contains a compound represented by a general expression (III):

[Formula 3]

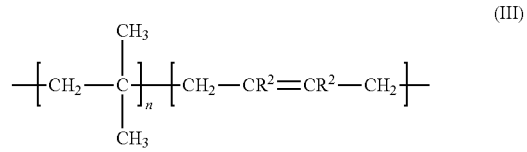
(III)

wherein $R^2$ is a hydrogen atom, a halogen atom, or an alkyl group with 1 to 3 carbons, and n is an integer of 1 or larger.

7. The metal-air cell according to claim 1, wherein the adhesive layer is unvulcanized rubber containing butyl rubber.

8. The metal-air cell according to claim 1, wherein the lead electrically connects to the negative electrode.

9. The metal-air cell according to claim 1, wherein the lead electrically connects to the positive electrode.

10. The metal-air cell according to claim 1, wherein each of the negative electrode and the positive electrode includes the lead extending outside from the inside of the outer pouch.

11. The metal-air cell according to claim 1, wherein the lead is formed of any one of nickel foil, nickel-plated iron foil, tin-plated nickel foil, copper foil, and brass foil.

12. A metal-air cell, comprising:
a negative electrode;
a positive electrode; and
an outer pouch housing the negative electrode and the positive electrode,
wherein:
at least one of the negative electrode and the positive electrode includes a lead extending outside from an inside of the outer pouch,
the lead includes a sealing member provided to an outer face of the lead,
the outer pouch includes a fusing portion in which the sealing member and the lead are held and fused together, the fusing portion sealing the outer pouch,
the sealing member including:
an adhesive layer covering the lead inside the outer pouch, and
a resin film layer fused with the outer pouch,
the resin film layer is directly in contact with the lead and the outer pouch at the fusing portion, and
the adhesive layer is located on a lower side of the fusing portion, is externally provided across the resin film layer and the lead, and coats an interface between the resin film layer and the lead at an end of the resin film layer located inside the outer pouch so that the interface between the resin film layer and the lead is kept from being exposed to an electrolytic solution inside the outer pouch.

* * * * *